United States Patent [19]

Pagotto et al.

[11] Patent Number: 5,192,735
[45] Date of Patent: Mar. 9, 1993

[54] PREPARATION OF LOW CHROMIUM ACTIVE CHARCOAL BY FREEZE DRYING IMPREGNATED CHARCOAL

[75] Inventors: Jack G. Pagotto, Kanata; Septimus H. C. Liang, Ottawa, both of Canada

[73] Assignee: Minister of National Defence of Her Majesty's Canadian Government, Ottawa, Canada

[21] Appl. No.: 837,913

[22] Filed: Feb. 20, 1992

[30] Foreign Application Priority Data

Mar. 1, 1991 [CA] Canada ................................ 2037438

[51] Int. Cl.$^5$ ........................ B01J 23/20; B01J 20/32; C01B 31/08; C01C 3/00
[52] U.S. Cl. ........................................ 502/417; 55/68; 55/71; 55/74; 128/205.27; 423/236; 423/240 S; 502/181; 502/182; 502/183; 502/184; 502/185; 502/406
[58] Field of Search ............... 502/181, 182, 183, 184, 502/185, 416, 417, 406; 423/236

[56] References Cited

U.S. PATENT DOCUMENTS

| | | | |
|---|---|---|---|
| 1,519,470 | 12/1924 | Wilson | 502/417 |
| 2,537,448 | 1/1951 | Engel | 502/181 |
| 3,652,214 | 3/1972 | Aboutboul et al. | 502/407 |
| 4,033,903 | 7/1977 | Maxwell | 502/347 |
| 4,636,485 | 1/1987 | van der Smissen | 502/181 |
| 4,801,311 | 1/1989 | Tolles | 423/236 |
| 4,802,898 | 2/1989 | Tolles | 423/236 |
| 5,063,196 | 11/1991 | Doughty et al. | 502/417 |

*Primary Examiner*—Paul E. Konopka
*Attorney, Agent, or Firm*—Nixon & Vanderhye

[57] ABSTRACT

Activated charcoal, or ASC whetlerite charcoal for use in providing protection against chemical warfare agents, contains chromium VI, which is a known carcinogen, as well as other metal impregnants. Thus disposal of the charcoal can present problems. The charcoal is usually impregnated with the chromium and other active metals by placing the charcoal in a solution of the metals, and oven drying the charcoal so that crystals are deposited thereon. It has been found that if the charcoal is freeze-dried the quantity of the metals such as chromium VI can be reduced by as much as 50% without compromising the performance of the charcoal.

10 Claims, No Drawings

PREPARATION OF LOW CHROMIUM ACTIVE CHARCOAL BY FREEZE DRYING IMPREGNATED CHARCOAL

This invention relates to a process for producing an activated charcoal impregnated with a metal, and in particular with chromium VI.

BACKGROUND OF THE INVENTION

So-called ASC whetlerite charcoal (hereinafter referred to also as activated charcoal), and such charcoal containing triethylenediamine (TEDA) is the adsorbent used in Canadian armed forces respirators and collective protection filters for providing protection against chemical warfare agents. ASC charcoal was developed during the 1940's in response to the established threat of chemical weapons. The charcoal is coal typically based and contains a pore structure suitable for the removal of volatile chemicals from air.

In general, the removal of chemical warfare vapour from air is achieved by two methods, namely physisorption and chemisorption. Physisorption or physical adsorption is the primary removal mechanism and is responsible for the very large capacity of charcoal for protection against agents with relatively high ($>100°$ C.) boiling points such as mustard gas (bis-(2-chloroethyl sulphide) or tabun (ethyl N,N dimethylphosphoramidocyanidate). However, toxic agents with much lower boiling points ($60°$ C.) such as hydrogen cyanide, phosgene and cyanogen chloride are not easily removed by physical adsorption. Accordingly, chemical reactive metals such as copper and chromium were added to the charcoal to provide a second removal mechanism which is commonly referred to as "chemisorption". Without the chemisorptive property imparted to charcoal by copper and chromium, the charcoal would provide little protection against hydrogen cyanide. Silver has also been used to provide chemisorptive protection against arsine. Another class of metals that may be added to the charcoal includes all oxidizing metals such as vanadium, chromium, molybdenum, tungsten, manganese, iron, ruthenium, osmium, cobalt and rhodium. This class of metals is used for the oxidation of cyanogen, a decomposition product from hydrogen cyanide, and cyanogen chloride. A further class of metals includes silver, zinc and cadmium for the removal of low molecular weight, low boiling point toxic gases such as arsine. A whetlerization formula usually consists of one or more metals from each class. In addition, the charcoal may contain organic compounds such as triethylenediamine (TEDA) and quinuclidine which prolongs the service life of the charcoal and also enhances the protection against cyanogen chloride.

In the production of such impregnated charcoal, base charcoal (BPL) is soaked with a very concentrated ammoniacal solution of copper II and chromium VI salts and a carbonate (this process is called "Whetlerization") and then oven dried. During oven drying, water is gradually removed to increase the concentration sufficiently to exceed the solubility limit. The result is the formation of very large crystals containing copper and chromium Hexavalent chromium plays a key role as an oxidant in the removal of hydrogen cyanide (AC) and cyanogen chloride (CK). Because only the outer surface of each crystal is available for reaction, a large proportion of active metal is not used, i.e. the copper and chromium are not fully utilized. The metals and consequently the adsorbent are expensive. Moreover, because of its toxicity, the chromium VI poses a disposal problem.

The object of the present invention is to provide a solution to the above-mentioned problems in the form of (a) a relatively simple process for producing an activated carbon adsorbent for use in protection against chemical warfare agents, and (b) the product produced by such process.

DESCRIPTION OF THE INVENTION

According to one aspect, the present invention relates to a process for impregnating charcoal with an impregnant for protection against chemical warfare agents comprising the steps of soaking the charcoal with an impregnating solution of the impregnant and freeze-drying the thus impregnated charcoal. It should be noted all the metal impregnants previously mentioned as well as the organic compounds are water soluble and therefore are suitable for freeze-drying.

According to another aspect, the invention relates to charcoal impregnated with chromium VI when prepared by the process described above.

The invention described herein is based on the realization that if the whetlerization process could be altered to produce charcoal coated with smaller crystals of metal, and the metal could be uniformly distributed over the carbon surface, then efficient use of the copper and chromium should be possible. Thus, a lower copper/chromium concentration could be used with the same efficacy as a higher concentration with large crystals.

Freeze drying or lyophilization is a technique which was developed in the early 1960's for removing water from solids. While the primary application of freeze-drying is in the food industry, it has also been used to control the size of crystals in other granular products. In the present case, the basic process involves the soaking of charcoal with concentrated metal salts. Because a solution of copper and chromium salts is used, the metals are well distributed throughout the charcoal. The mass is frozen solid, a vacuum is applied and heat is delivered in a controlled manner so that frozen water is evaporated directly from the solid state without being converted to liquid. This reduces or prevents the movement of metal ions so that large crystals cannot form.

The use of freeze-drying depends on the homogeneous properties inherent to liquid solutions. If a solution is frozen sufficiently rapidly to prevent precipitation of the solute, and if melting during sublimation is limited, the resulting freeze-dried material should retain the state of subdivision and the degree of homogeneity of the starting mixture. Unlike the situation when water is removed by heating, crystal growth is minimized and dispersion of the solute throughout the matrix is quite close to that which existed when the solute was in a liquid solution. Freeze-drying results in the distribution of copper and chromium over the surface of the charcoal in small crystals having a relatively large surface area.

Typically, freeze drying involves three phases, namely (1) freezing, (2) primary drying and (3) secondary drying. Freezing may be induced quickly using a cryogenic gas of fluid, or it may be allowed to occur through evaporative cooling while applying a vacuum. In the case of whetlerization the quick method is preferred so that migration of metal ions to the surface of the granules is minimized.

The primary drying stage occurs as the ice slowly sublimes at the rate at which energy for latent heat is supplied. The vapour given off is prevented from returning to the product and from reaching the vacuum pump by a cold trap or refrigerated condenser in the flow path of the vapour. The sublimation rate depends on the driving force imposed by the difference in vapour pressure between the ice interface and the condenser. The use of a vacuum ensures that the interface temperature is always low. The energy for latent heat required for sublimation can be provided by conduction or by using microwaves.

Secondary drying starts when the last of the crystallized water is sublimed and moisture begins to desorb (or ice sublime, depending on the temperatures involved) directly from the bulk material. If heating is provided, it is normally reduced during secondary drying so that the temperature of the material does not exceed limiting values (usually $-30°$ to $-50°$ C.). Secondary drying is also accompanied by a noticeable drop in pressure because of the inherently low vapour pressure of water vapour at this point. This drying phase typically takes up to one third of the total drying time. Porous material such as charcoal with a large internal surface area takes longer to dry because of the greater quantity of surface adsorbed water.

Freeze-drying continues to occur while there is a state of unbalance between the ice in the charcoal and the system pressure/temperature conditions. In other words, the migration of water vapour from the material being dried continues as long as the ice in the charcoal is at a higher energy level than the rest of the system. In order to freeze dry a material in the least possible amount of time, the equipment must present an isolated set of temperature and pressure differences such that the maximum amount of heat which can be applied to the product without causing a change from the solid to the liquid state (called "melt back") is provided. A critical requirement to achieve this objective is the maintenance of a low condenser temperature.

In order for freeze-drying to occur efficiently, the following four conditions must be achieved, in order: 1) the product must be frozen solid below its eutectic point, typically for such aqueous solutions of charcoal below $-5°$ C., preferably $-5°$ to $-40°$ C., 2) a condensing surface must be provided with a temperature below $-40°$ C., (3) a vacuum of 5-25 microns of Hg must be maintained, and (4) heat of sublimation and evaporation must be provided in a controlled manner, from $-40°$ and $65°$ C.

EXPERIMENTAL

The process can work with sieve sizes for the charcoal ranging from U.S. Sieve sizes 4 down to 80. In the present case, however, the charcoal used is BPL 12×30 mesh coal-based charcoal obtained from Calgon Carbon Corporation, Pittsburgh, Pa., U.S.A. The BPL charcoal was impregnated with copper and chromium using a standard method. Silver, which is normally included in ASC whetlerite military carbons to provide protection against arsine, was omitted from the impregnation solution.

A standard whetlerization formula consists of an ammoniacal solution of 7% copper II and 2% chromium VI. The solution was produced by adding 142 mL of concentrated ammonium hydroxide to 200 mL of deionized water in a 600 mL beaker. 17.3 g of chromic anhydride ($CrO_3$) was added to the hydroxide with mechanical stirring until the anhydride is completely dissolved into a yellow solution. 71 g of ammonium carbonate was added to the solution while stirring continuously until the carbonate is dissolved. Finally, 57 g of basic copper carbonate, $CuCO_3.Cu(OH)_2$, was added and the solution was mixed until all solids were dissolved to yield a green-blue impregnating solution with a specific gravity of approximately 1.2.

The weight percentages of copper, chromium, carbonate and ammonia in the solution were approximately 7.0, 1.8, 8.7 and 12.5, respectively. Impregnating solution was gradually added to the charcoal while mixing until a liquid excess was plainly visible. The resulting ratio of impregnating solution to charcoal was approximately 1.4 mL. The wet charcoal was removed, and drained while shaking for 30 to 45 minutes.

In order to optimize the freeze-drying process, several variations in the impregnating formula described above were evaluated. As shown in Table I which follows, the concentrations of copper and chromium were varied from 5 to 75% of the concentrations in the original formula. In order to obtain baseline data, both copper-only and chromium-only impregnations were performed. In one experiment, the amount of ammonium carbonate was reduced by 50%.

The freeze-drying technique employed involved a prefreezing stage in which the charcoal samples were frozen at $-28°$ C. using a Haake Q F3 cooling bath and freeze-drying flasks. While it appeared that the charcoal was frozen after 10 minutes, a total of 20 minutes was used to ensure freezing was complete. In order to enhance heat transfer out the flasks, the charcoal was gently pressed and moulded onto the sides of the flask using a large spatula. The volumes of the flasks used were approximately twice the volume of the sample.

A Labconco Lyph-Lock 4.5 L Freeze Dry system was used to freeze dry the charcoal. A Precision direct drive vacuum pump (model DD-100) with a flow rate of 100 L/min was connected to the freeze-drier. Typically, the condenser was allowed to lower to $-75°$ C. and a vacuum of less than 10 microns of Hg achieved prior to introducing the samples. As each sample was introduced, the pressure was allowed to recover to below 100 microns before adding the subsequent sample. The design of the freeze dry system was such that latent heat of sublimation is extracted from conduction from room air through the walls of the freeze-drying flasks. Since this system did allow control of heat input, melt-back had to be prevented by insuring that the vacuum was sufficient at all times. The material loading (number of flasks) was varied to determine the optimum capacity and to ensure that the condenser was capable of removing all of the water vapour sublimed.

The freeze-drying apparatus was relatively simple in that there was no control of the rate of heat delivery to the frozen sample.

As a control, a batch of charcoal was impregnated as described above, except that the standard procedure for removing water by oven drying was used. The wet charcoal was spread to an even thickness on a Teflon (trade-mark) screen and dried in a forced-draft (Fisher Series 400 Isotemp) oven. The temperature for drying was increased gradually over a period of 2.3 hours as follows: 80° C. (40 min), 100° C. (20 min), 120° C. (20 min), 140° C. (20 min), 160° C. (20 min), and 180° C. (20 min).

A Computrac TMX Moisture Analyzer (Arizona Instruments) was used to determine the moisture content of the freeze-dried and oven dried charcoal. The sample size ranged from 1-2 g such that 20 to 50 mg of water was removed from the sample during a typical assessment. A temperature set point of 180° C. and a drying rate of 500 μg/min was used to perform the measurement. The accuracy of this instrument was estimated to be ±0.5% moisture.

It is well known that charcoals age and degrade in performance if exposed to humidity. Hence most military purchase specifications impose a ceiling limit of approximately 2.0% moisture content for charcoals used in air filtration. A series of charcoals soaked with distilled water were dried for varying amounts of time to determine, for the particular freeze-drying system used in this experiment, the optimum drying time. This was found to be approximately 0.2 hrs/g of soaked charcoal when a sample freezing temperature of −28° C. was employed and room temperature was approximately 25° C. (vacuum in all experiments was maintained below 10 microns of Hg).

Initial attempts to freeze dry charcoal using the standard formulation described above resulted in a large amount of green deposits occurring on the charcoal surface. This is believed to be indicative of a poor impregnation in which a nonhomogeneous distribution of metals throughout the meso and macroporous surface was evidently achieved. The objective of the following experiments was to vary parameters so that the deposition would occur within the charcoal granules and not solely on the surface. Table 1 lists the experiments performed and the observations gathered.

A variety of parameters were altered in order to determine the cause of the discoloration and in hopes of achieving a homogeneous deposition of copper and chromium so that a uniformly black charcoal could be obtained. The most obvious parameters that were adjusted were the pre-freezing method, the condenser temperature, and the concentration of the solution. Table 1 lists the results of these variations.

One possibility for the poor homogeneity was that the pre-freezing step was not performed quickly or thoroughly enough. If metal ions were in solution sufficiently long to migrate to the surface where they could then precipitate as water is removed from solution by freezing, this would explain the green coloration at the surface of the charcoal granules. In order to investigate the effect of altering the rate of pre-freezing, several experiments (7-10 in Table 1) were performed where this was varied using various cooling temperatures for varying amounts of time. Varying the pre-freezing rate was found to have no noticeable effect on the green coloration. One interesting observation was that when the charcoal was frozen at 0° C. for 19 hours (experiments 8 and 9 in Table 1), charcoal next to the glass flask surface was observed to have an unusually shiny grey-green appearance. This phenomenon was not investigated further.

TABLE 1

| EXPT* | $H_2O$ (mL) | $NH_4OH$ (mL) | $CrO_3$ (g) | $(NH_4)_2CO_3H_2O$ (g) | $CuCO_3$ $Cu(OH)_2$ (g) | BPL charc. (g) | S.G. (g/mL) | Impreg. Sol. Added (mL) |
|---|---|---|---|---|---|---|---|---|
| 1[3] | 200 | 142 | 17.3 | 71 | 62.0 | 250 | 1.20 | 350 |
| 2 | 200 | 28 | 0.65 | 14 | 2.8 | 50 | 1.03 | 100 |
| 3[4] | 200 | 28 | 1.73 | 14 | 5.7 | 100 | 1.03 | 170 |
| 4 | 200 | 28 | 1.73 | 14 | 5.7 | 125 | 1.03 | 200 |
| 5[2] | 200 | 142 | 17.3 | 71 | 57.0 | 250 | 1.20 | 360 |
| 6 | 200 | 142 | 17.3 | 71 | 28.0 | 250 | 1.15 | 300 |
| 7[2] | 200 | 142 | 17.3 | 71 | 28.0 | 290 | 1.15 | 385 |
| 8[2] | 200 | 142 | 17.3 | 71 | 57.0 | 260 | 1.2 | 390 |
| 9 | 100 | 71 | 8.7 | 35.5 | 28.0 | 125 | 1.2 | 200 |
| 10[2] | 200 | 142 | 17.3 | 35.5 | 57.0 | 250 | 1.16 | 370 |
| 11 | 18 | 41 | — | 7.5 | 8.3 | 68 | 1.11 | 62 |
| 12 | 10 | 46 | 2.6 | 21 | — | 45 | 1.02 | 76 |
| 13 | 40 | 28 | 3.5 | 14 | 8.5 | 50 | 1.14 | 82 |
| 14 | 40 | 28 | 2.6 | 14 | 11.4 | 50 | 1.18 | 82 |
| 15 | 40 | 28 | 1.73 | 14 | 11.4 | 50 | 1.16 | 80 |
| 16 | 40 | 28 | 2.3 | 14 | 11.4 | 50 | 1.18 | 80 |

| EXPT* | Soaked Wt. (g) | Freezing Method** | Freeze-Drying Time (hrs) | Moisture Content (%) | Appearance of Charcoal |
|---|---|---|---|---|---|
| 1[3] | 180 | 1 | 16.3 | — | green |
| 2 | 30 | 1 | 15.5 | 1.3 | black |
| 3[4] | 30 | 1 | 17.7 | 0.8 | black |
| 4 | 145 | 1 | 15.5 | 2.4 | black |
| 5[2] | 125 | 1 | 19.25 | 3.5 | green |
| 6 | 260 | 1 | 16.0 | 6.4 | grey-green |
| 7[2] | 160 | 2 | 17.0 | — | grey-green |
| 8[2] | 160 | 3 | 21.25 | 4.3 | shing grey-green |
| 9 | 160 | 3 | 21.25 | 4.1 | shiny grey-green |
| 10[2] | 190 | 1 | 15.7 | 3.9 | yellow-green |
| 11 | 160 | 1 | 15.0 | 2.5 | wet: blue, dry: black |
| 12 | 86 | 1 | 17.0 | 1.1 | wet: yellow, dry: black |
| 13 | 104 | 1 | 14.75 | 2.3 | yellow-green |
| 14 | 101 | 1 | 16.3 | 2.0 | green (60% of charc.) |
| 15 | 101 | 1 | 16.0 | 3.8 | black |
| 16 | 101 | 1 | 16.2 | — | green (20% of charc.) |

*Superscript indicates number of repetitions for a given experiment.
**(1) Flask in −28° C. bath for 20 min.; (2) 0° C. refrigerator for 1 hr, then −23° C. freezer for 4 hr; (3) 0° C. refrigerator for 19 hr;

The effect of decreasing the concentration of the impregnating solution was also investigated. Experiments 2-4 (Table 2) confirmed that lowering the concentration did remove the discoloration effect. A black charcoal was obtained when the solution contained 20% of the standard ammonia and carbon dioxide and 10% or less of the standard copper and chromium concentrations. Experiments where the amount of ammonium carbonate in the impregnating solution was halved caused the charcoal to turn a very bright yellow-green. Baseline experiments were performed to determine the independent effects of both copper and chromium. The frozen charcoal in the copper-only impregnation was blue but after freeze-drying, it returned to black with no evidence of other colorations. Similarly, the chromium-only impregnated charcoal turned yellowish green upon freezing but returned to a colourless black after freeze-drying. Therefore, it was concluded that the green discoloration observed in the initial freeze-drying experiments must have been caused by the formation of a copper chromium complex at the surface of the charcoal.

The concentration of the copper was then reduced while the concentration of chromium was maintained at 2% by weight. In experiment 13, 75% of the standard amount of copper was used but the resulting charcoal was still obviously discoloured. When the copper concentration was reduced by half, deposits were plainly visible on the dried charcoal but were a pale grey-green instead of the bright green originally observed. The copper concentration was not reduced further because it was assumed that a charcoal with less than 3.5% of copper would not be effective against AC and CK.

Finally, the concentration of chromium in the impregnating solution was varied. Reducing the CrO3 concentration was reduced to 50% of the standard solution, a black, colourless dry charcoal was obtained. Hence, the optimum impregnating solution for freeze-dried charcoal was empirically determined (by visual observation of charcoal discolorations alone) to be 7% copper and 1% chromium. This is the same as the standard solution except that the chromium concentration is halved.

TABLE 2

| EXPERIMENT | NH$_4$OH (%) | Cr(VI) (%) | (NH$_4$)$_2$CO$_3$H$_2$O (%) | Cu(II) (%) | Appearance of Charcoal |
|---|---|---|---|---|---|
| 1 | 12.5 | 1.8 | 8.7 | 7.0 | green |
| 2 | 2.5 | .072 | 1.74 | .35 | black |
| 3 | 2.5 | .18 | 1.74 | .7 | black |
| 4 | 2.5 | .18 | 1.74 | .7 | black |
| 6 | 12.5 | 1.8 | 8.7 | 3.5 | pale grey-green |
| 10 | 12.5 | 1.8 | 4.35 | 7.0 | yellow-green |
| 11 | 12.5 | 0 | 8.7 | 7.0 | wet: blue, dry: black |
| 12 | 12.5 | 1.8 | 8.7 | 0 | wet: yellow dry: black |
| 13 | 12.5 | 2.8 | 8.7 | 5.25 | yellow-green |
| 14 | 12.5 | 1.35 | 8.7 | 7.0 | green (60% of charcoal) |
| 15 | 12.5 | 0.9 | 8.7 | 7.0 | black |
| 16 | 12.5 | 1.21 | 8.7 | 7.0 | green (60% of charcoal) |

GAS LIFE PERFORMANCE

Charcoal samples to be tested for gas life performance were placed in C2 respirator filter bodies (10.5 cm diameter×2.0 cm bed depth) and sealed in air tight enclosures until the time of testing. The filter body filling procedure is a standard one used for preparing respirator filters. This involves passing the charcoal through a snowfall filling device which imparts rotational moments on the falling charcoal granules so that optimum packing of the test cell is achieved. The 20 mm charcoal bed is then swaged into place using a 136 kg (300 lb) dead load.

The gas life tests performed included hydrogen cyanide (AC), cyanogen chloride (CK) and chloropicrin (PS). These gases are commonly used test gases for evaluating the chemisorptive (AC, CK) and physisorptive (PS) performance of military chemical warfare filters. The whetlerization formula includes chromium VI because, in the presence of copper (which assists in the removal of acidic byproducts), it breaks down AC and CK. Chloropicrin is not considered a chemical warfare agent but is used as a test gas for evaluating charcoals because it is known to provide a very sensitive measure of a charcoal's distribution of macro-/meso/micropores. Charcoals with very high surface areas and having only micropores do not provide as much adsorptive capacity as charcoals with a mixture of the larger pores that facilitate the mass transfer into the large microporous area.

Clearly the gas life performance for CK and AC will provide the most critical data for comparison of the freeze-dried and oven dried charcoals. If the hypothesis that freeze-drying provides a more homogeneous more microcrystalline distribution of the copper and chromium crystals in the charcoal, then the chemisorptive capacity should exceed that of oven dried.

The gas tests employed are standard tests. For both the AC and CK gas tests, the charcoal filter was preconditioned by passing 80% RH air at 25° C. and 30 L/min through it until constant weight was achieved (typically 24 hours is required to adsorb 28-33 g of water per 110 mL of charcoal). The filter was then challenged with AC or CK at 4 mg/L using a constant 30 L/min flow of 80% RH air at 22° C. until a concentration of 0.002 mg/L was detected in the effluent (break point). The time required to achieve the break point is called the charcoal filter's 'gas life'. Chloropicrin gas life tests were performed in an identical manner except that 5 mg/L was used as a challenge concentration.

Using the optimized freeze-drying procedure and the whetlerizing formula which did not cause discoloration (1% chromium instead of 2%), several batches of charcoal were prepared for gas life testing. Batches of 420 grams each were prepared using two freeze-drying flasks. All of the charcoals were freeze-dried for 22 hours. The standard impregnating formula (2% chromium) was used for the oven dried charcoals. Enough charcoal was made to conduct duplicate gas life tests with AC, CK and PS using C2 respirator bodies as test cells.

As described above all gas tests were preceded by a preconditioning step where the charcoal was equilibrated with humid air. Tables 3-5 also show the water uptake for the oven and freeze-dried charcoals. The reduced amount of water uptake for the latter indicated that drying was not 100% complete and may imply that the gas life results would be even better if the charcoal were dried longer. Tables 3–5 also show the gas life data for CK,AC and PS, respectively.

TABLE 3

| Sample # | Drying Method | Chromium Loading (%) | Water Uptake During Pre-conditioning at 25° C., 80% RH (g) | Filter Break Time (min.) |
|---|---|---|---|---|
| 1 | OVEN DRIED | 2.00 | 33.33 | 22 |
| 2 | OVEN DRIED | 2.00 | 33.15 | 29 |
| 3 | Freeze-dried | 1.00 | 28.19 | 26 |
| 4 | Freeze-dried | 1.00 | 27.96 | 20 |
| 5 | Freeze-dried | 1.00 | 28.30 | 33 |
| 6 | OVEN DRIED | 1.00 | 32.48 | 15 |
| 7 | OVEN DRIED | 1.00 | 30.92 | 17 |

TABLE 4

| Sample # | Drying Method | Chromium Loading (%) | Water Uptake During Pre-conditioning at 25° C., 80% RH (g) | Filter Break Time (min.) |
|---|---|---|---|---|
| 8 | OVEN DRIED | 2.00 | 32.47 | 37 |
| 9 | Freeze-dried | 1.00 | 28.93 | 43 |
| 10 | Freeze-dried | 1.00 | 28.50 | 41 |
| 11 | Freeze-dried | 1.00 | 28.11 | 36 |

TABLE 5

| Sample # | Drying Method | Chromium Loading (%) | Water Uptake During Pre-conditioning at 25° C., 80% RH (g) | Filter Break Time (min.) |
|---|---|---|---|---|
| 12 | OVEN DRIED | 2.00 | 31.86 | 76 |
| 13 | Freeze-dried | 1.00 | 28.40 | 94 |
| 14 | Freeze-dried | 1.00 | 27.64 | 101 |
| 15 | Freeze-dried | 1.00 | 27.99 | 93 |

The most significant finding from the gas life tests was, as can be seen in Table 3, that the freeze-dried charcoals with 1% chromium (Samples 3, 4 and 5), provided approximately the same CK gas life as the oven dried charcoal with twice as much chromium (average of 26). Oven dried charcoals with the same chromium concentration as for the freeze-dried samples (Samples 6 and 7) provided only one half the CK gas life (average of 16 minutes). This suggested that a larger proportion of the chromium present in the freeze-dried charcoal was available for reaction with the CK than for the oven dried charcoal. This evidence supported the original hypothesis that freeze-drying would enhance the homogeneity of the chromium crystallite distributions.

The AC and PS gas lives for the freeze-dried charcoals were found to be comparable (Tables 4 and 5) to and slightly higher than those of the standard oven dried charcoals. Table 6 summarizes all of the results in one table. This data establishes that freeze-drying charcoal results in an ASC charcoal which is able to make more efficient use of the active chromium metal than the standard process with oven drying.

TABLE 6

| Carbon Type | Cr (%) | Density (mg/mL) | Water Pick-up[1] (g) | CK Gas Life (min) | AC Gas Life (min) | PS Gas Life (min) |
|---|---|---|---|---|---|---|
| Fresh[2] Freeze-dried | 1 | 558 ± 12 | 28.22[4] ± 0.37 | 26 ± 6 | 40 ± 4 | 96 ± 4 |
| Aged[3] Freeze-dried | 1 | NA[5] | 6.21 ± 0.70 | 16 ± 8 | 42 ± 5 | 42 ± 4 |
| Fresh Oven Dried[6] | 1 | 531 ± 13 | 32.08 ± 1.02 | 16 ± 1 | NA[5] | NA[5] |
| Fresh Oven Dried[7] | 2 | 557 ± 8 | 30.48 ± 1.05 | 26 ± 9 | 37 | 76 ± 13 |

NOTES:
[1]Weight of water adsorbed per 170 mL of carbon after preconditioning fresh charcoal at 30° C., 80% RH until constant weight was achieved.
[2]This charcoal was prepared and then stored in a closed container. The average time between whetleriztion of charcoal and gas life evaluation was approximately 90 days. Impregnation mixture resulted in 1% Cr and 7% Cu.
[3]Charcoal from 'Fresh Freeze-dried' (above) that was subjected to 'accelerated ageing' by exposing a thin bed of it on a flat tray to 80% RH at 40° C. for 7 days.
[4]Standard deviations were measured using at least 6 samples.
[5]Not measured.
[6]Oven dried charcoal was prepared in exactly the same manner was as freeze-dried charcoal (7% Cu, 1% Cr) except that it was dried in a forced-air oven.
[7]Oven dried charcoal with 7% Cu, 2% Cr.

SUMMARY

In summary, the removal of water from charcoal soaked with a whetlerizing ammoniacal solution of copper and chromium by sublimation at reduced pressures (feeze-drying) enhances the homogeneous distribution of the metal crystallites. The application of freeze-drying to the production of ASC whetlerite charcoal allows the use of lower concentrations of chromium VI as a consequence of more efficient smaller crystal sizes. Finally, freeze-dried ASC whetlerite charcoal allows a reduction of chromium content without compromising the performance of the charcoal.

We claim:

1. A process for producing an activated carbon adsorbent having crystals of chromium VI uniformly distributed over the carbon surface, said process comprising the steps of:
   (a) soaking charcoal in an impregnating solution of chromium VI;
   (b) draining excess impregnating solution from the charcoal, and thereafter
   (c) freeze-drying the thus impregnated charcoal to provide chromium VI crystals uniformly distributed over the carbon surface.

2. A process according to claim 1, wherein the impregnating solution also contains copper II.

3. A process according to claim 2, wherein the quantities of copper and chromium added to the charcoal are 5.5 to 8.5% by weight and 0.5 to 1% by weight, respectively.

4. A process according to claim 3, wherein the impregnating solution is an ammoniacal solution prepared by mixing ammonium hydroxide with chromic anhydride, ammonium carbonate and basis copper carbonate.

5. A process according to claim 4, wherein the ammonium hydroxide is added to deionized distilled water, the chromic anhydride is dissolved in the hydroxide, the ammonium carbonate is dissolved in the resulting solution, and finally the basic copper carbonate is dissolved to yield the impregnating solution.

6. A process according to claim 5, wherein the impregnating solution contains approximately 5.5 to 8.5% by weight copper, 0.5 to 1.0% by weight chromium, approximately 8.7% by weight carbonate and approximately 12.5% by weight ammonia.

7. A process for producing an activated carbon adsorbent having crystals of chromium VI uniformly distributed over the carbon surface, said process comprising the steps of:

(a) soaking charcoal in an impregnating solution of chromium VI;
(b) draining excess impregnating solution from the charcoal;
(c) prefreezing the charcoal for 20 to 40 minutes at a temperature below the eutectic point of the impregnated charcoal; and thereafter
(d) freeze-drying the impregnated charcoal in a vacuum of 5 to 60 microns at a temperature of $-40°$ C. to $-65°$ C. for 16 to 48 hours.

8. A process according to claim 7, wherein prefreezing is effected at $-5°$ C. to $-40°$ C.

9. A process according to claim 8, wherein prefreezing is effected at approximately $-28°$ C. for approximately 30 minutes, and freeze-drying is effected under a vacuum of approximately 10 microns, at a temperature of approximately $-60°$ C. for approximately 24 hours.

10. A process according to claim 9, wherein the quantity of chromium VI added to the charcoal is from 0.5 to 1% by weight.

* * * * *